United States Patent [19]

Bennett

[11] Patent Number: 4,826,236

[45] Date of Patent: May 2, 1989

[54] CURTAIN-SIDED VEHICLE APPARATUS

[75] Inventor: Walter Bennett, City of Industry, Calif.

[73] Assignee: Utility Trailer Manufacturing Co., City of Industry, Calif.

[21] Appl. No.: 50,097

[22] Filed: May 14, 1987

[51] Int. Cl.⁴ .............................................. B60J 5/06
[52] U.S. Cl. ................................... 296/181; 160/84.1
[58] Field of Search .............. 296/181, 183; 160/84 R

[56] References Cited

U.S. PATENT DOCUMENTS 3,709,552  1/1973  Broadbent ........................... 296/183
4,408,793  10/1983 Broadbent ........................... 296/181
4,545,611  10/1985 Broadbent ........................... 296/183
4,700,985  11/1987 Whitehead ........................... 296/181

Primary Examiner—Robert R. Song
Attorney, Agent, or Firm—Lyon & Lyon

[57] ABSTRACT

A mobile panel that provides easy access to cargo loads in the center of a curtain-sided vehicle. A main tensioning device, usually installed at a front corner of a curtain-sided vehicle is used for applying horizontal tension to the curtain. Vertical tensioning straps along the length of the curtain provide vertical tension to the curtain as well as load security. At the rear of the curtain-sided vehicle a curtain pole, attached to the curtain, is inserted in a channel and anchored securely so that tension may be applied by the main tensioning device at the front of the curtain-sided vehicle. A mobile panel is located in the center of the curtain. The mobile panel hangs from rollers which engage a rail along the upper outside edge of the curtain-sided vehicle. The mobile panel has two quick release devices for receiving and securing curtain poles that are attached to the curtain. One section of the curtain extends from the front of the vehicle to one side of the mobile panel and a second section of curtain extends from the other side of the mobile panel to the rear of the vehicle.

3 Claims, 3 Drawing Sheets

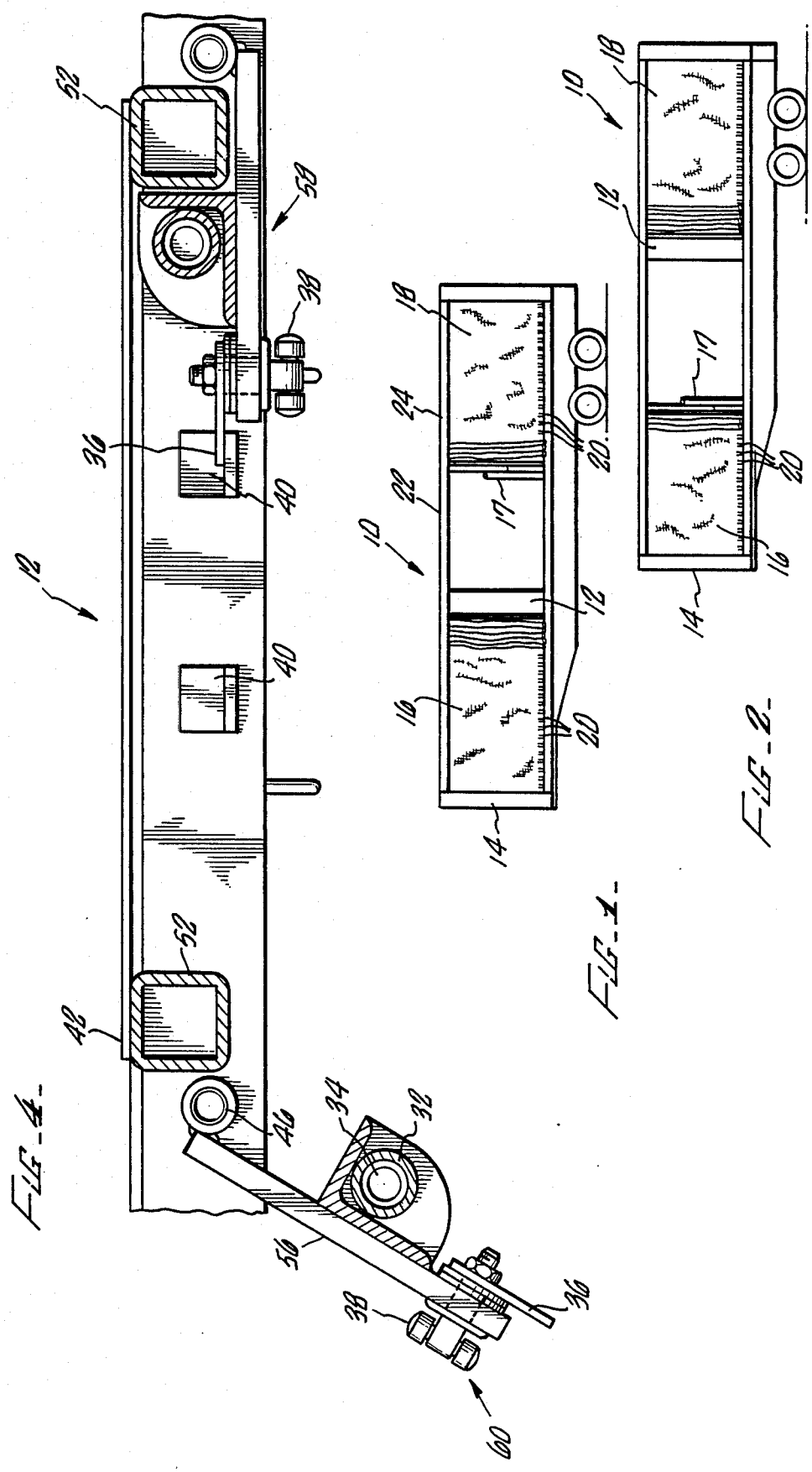

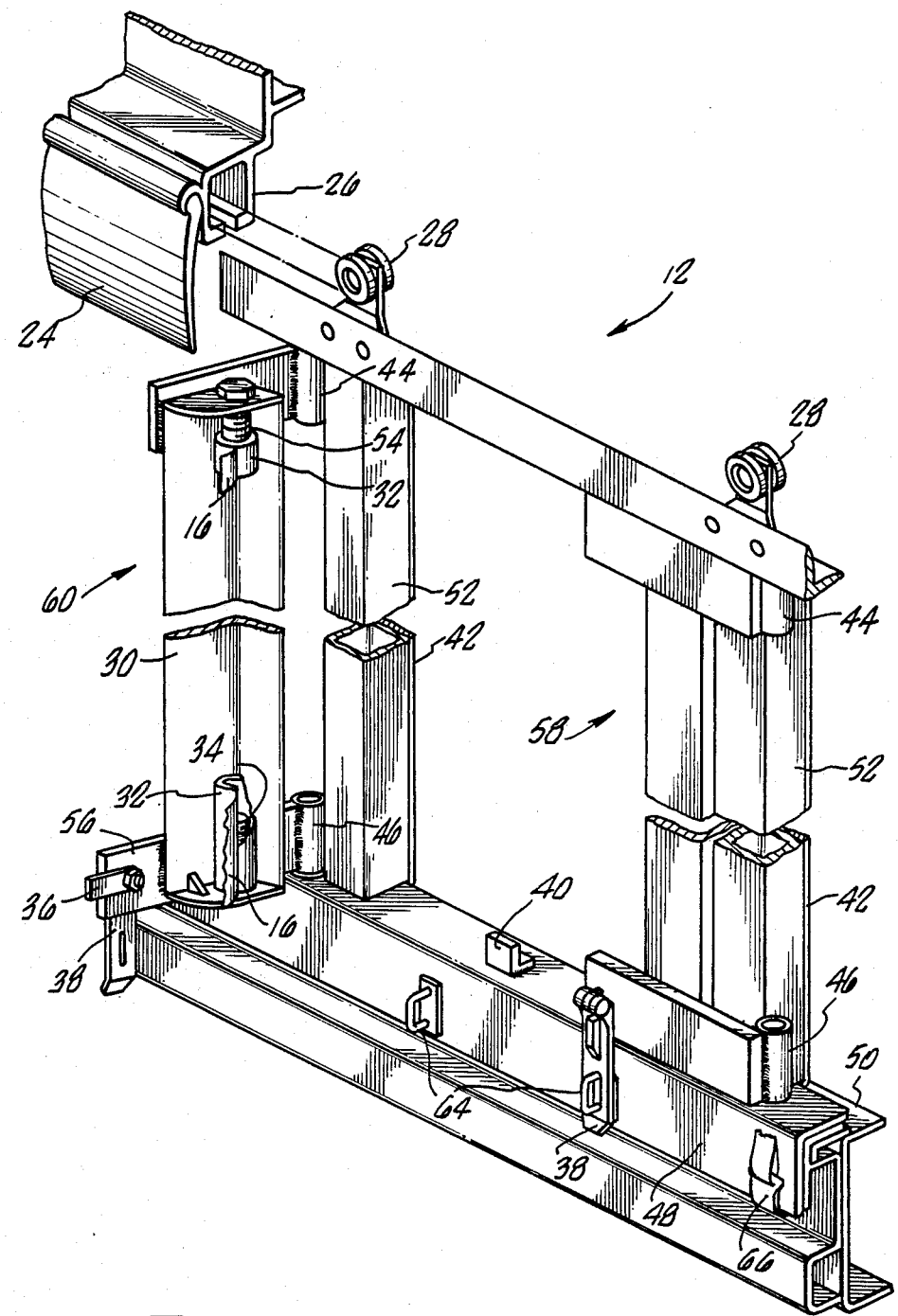
FIG_3

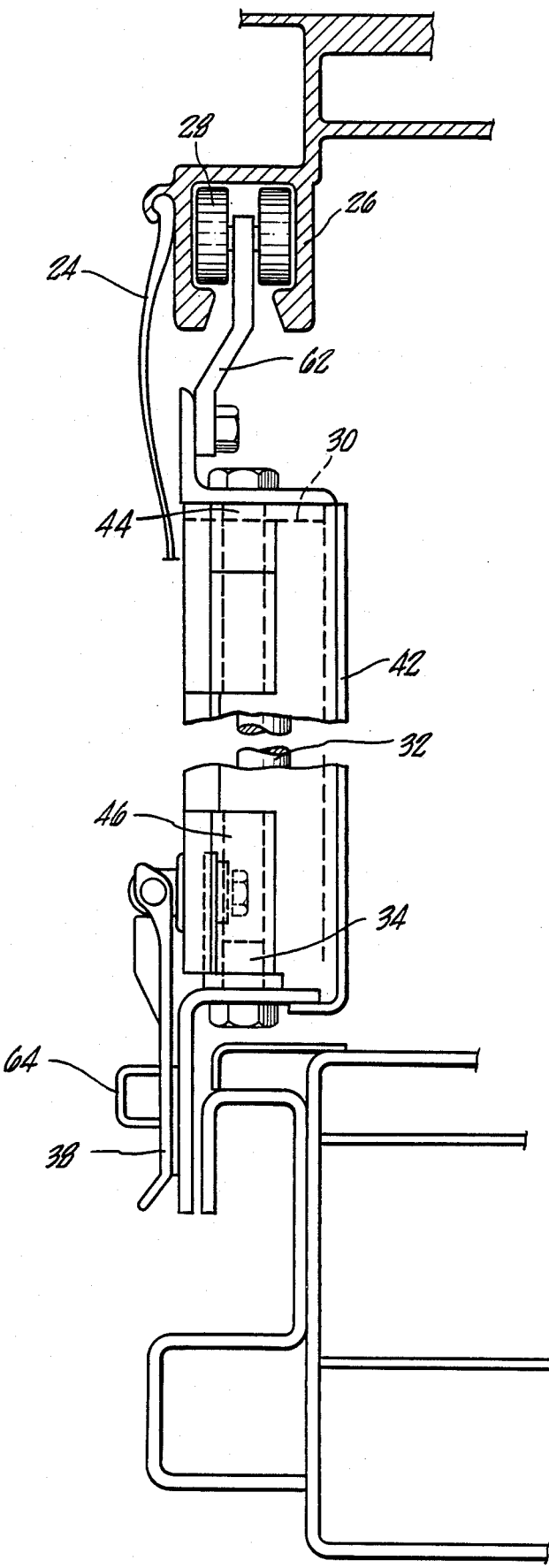
FIG_5

CURTAIN-SIDED VEHICLE APPARATUS

BACKGROUND OF THE INVENTION

This application relates to a curtain-sided vehicle such as described in U.S. Letters Pat. Nos. 3,709,552 and 4,545,611. Curtain-sided vehicles combine some of the advantages of a flatbed trailer with those of an enclosed or slab-sided trailer. A flatbed trailer or truck body offers the advantages of easy cargo accessibility and more efficient loading and unloading. However, to protect a load from weather conditions such as rain and snow, a tarp must be placed over the load and securely tied down. This consumes time and adds to the expense of moving a load. A slab-sided trailer or truck body offers the advantage of weather protection but sacrifices the convenience of side-loading and unloading. Slab-sided vehicles are normally loaded from the rear wherein the front cargo is loaded first and the rear cargo is loaded last. It is difficult to load containerized cargo of any length, in this manner. Containerized cargo is normally loaded on a flatbed trailer which offers no weather protection unless a tarp is placed over the containers. Curtain-sided vehicles such as the one described in the 552' patent offer weather protection as well as the convenience of side-loading. In the vehicle disclosed in the 552' patent, a curtain pole is attached to a curtain and the curtain and pole are secured to the rear of the trailer. The tensioning device at the front of the vehicle is then used to tension the curtain horizontally and a set of vertical straps are secured to the bed of the trailer to provide load security as well as vertical tension. If access to the load is necessary, the front tensioning device is released, all the vertical straps are released and the curtain is pulled back to the point where the load is to be accessed. Overall, this procedure is more efficient than the procedure used to load and unload ordinary slab-sided vehicles. However, an unnecessary amount of time and effort is consumed in accessing a load near the center of the vehicle since the front tensioning device and vertical straps must be released before the curtain can be pushed away from where it is secured at the rear of the vehicle. The manner in which the present invention deals with such problems of the prior art will by understood as this description proceeds.

CROSS REFERENCE TO RELATED APPLICATIONS

The present invention is related to the apparatus disclosed in the application entitled "Vehicle Curtain Quick Release Device" filed concurrently herewith in the names of Walter Bennett and Terry Horton, with Ser. No. 07/050,228 and incorporated herein by reference.

SUMMARY OF THE INVENTION

The present invention concerns a mobile panel located along the side of a curtain-sided vehicle in approximately the center portion. The panel is adapted to move on rollers which engage a rail along the top edge of the curtain-sided vehicle. Each end of the panel has a channel which is adapted to accept a curtain pole. A front section of the curtain extends from the front of the trailer to one side of the mobile panel and the rear section of the curtain extends from the other side of the mobile panel to the rear of the vehicle. In the preferred embodiment, quick release devices are located on each end of the mobile panel which allows for quick and efficient access to loads near the center of the trailer. A tensioning device at the front of the trailer is normally used to apply horizontal tension to the curtain. Vertical curtain straps apply vertical tension to the curtain and also provide load security. When access to the center of the trailer is desired, one or both of the quick release devices on the mobile panel is unlocked and the vertical straps in the area where the load is to be accessed are unfastened. If the load is behind the mobile panel, then the mobile panel is simply pushed aside to allow access to the load. After the load has been inserted or removed, the mobile door is slid back in to place, the curtain poles are replaced and horizontal tension is restored to the curtain by closing and locking the quick release devices located on the mobile panel. The vertical straps are then secured. This procedure allows for more efficient access to loads in the center of the trailer and at the same time does not limit the usable length of the trailer by having a fixed panel in the center of the trailer.

Accordingly, it is an object of the present invention to provide easy and more efficient access to the center portion of a curtain-sided vehicle without decreasing the usable length of the trailer.

It is another object of the present invention to provide a mobile door panel with a quick release mechanism that is easy to operate, that will not damage the pelmet and, at the same time securely fastens the curtain to the mobile panel.

A form in which the invention may be effectively and economically constructed will be seen from the following of a typical embodiment thereof.

BRIEF DESCRIPTION OF THE DRAWINGS

FIG. 1 shows a side view of a curtain-sided vehicle with a mobile panel moved to a forward position on the side of the vehicle;

FIG. 2 shows the same curtain-sided vehicle as shown in FIG. 1 with the mobile panel moved toward the rear of the vehicle;

FIG. 3 is a perspective view of the mobile panel shown with two quick release devices;

FIG. 4 is a top cross-section view of the mobile panel and quick release devices; and FIG. 5 is a side cross-section view of the mobile panel suspended on rollers from a rail.

DESCRIPTION OF THE PREFERRED EMBODIMENT

Referring to FIG. 1, a curtain-sided vehicle 10 is shown with a mobile panel 12 moved to a position forward of the center of the trailer. A horizontal tensioning device (not shown) is located at the front 14 of the vehicle. A plurality of vertical tensioning straps 20 are shown along the lower edges of the front curtain 16 and the rear curtain 18. Two removeable roof supports 17 are shown, extending from the bed of the vehicle to the top 22 of the vehicle. Attached at the top of the curtains 16 and 18 are a plurality of rollers (not shown) which also engage a rail 26 (FIG. 3) along the top portion of the vehicle 10. Attached to the top portion of the vehicle is a pelmet 24 which covers the top of the curtain. At the rear of the vehicle is located a curtain pole receptacle or a quick-release device as disclosed in the cross-referenced co-pending application.

FIG. 2 shows the curtain-sided vehicle 10, also shown in FIG. 1, with the mobile panel 12 moved to the rear of the center of the trailer. This arrangement allows for easy access to the center portion of the curtain-sided vehicle and also allows long loads such as loads longer than one half the length of the trailer to be easily inserted and removed by simply pushing the mobile panel to the front or to the rear.

FIG. 3 is a perspective view of the mobile panel 12. The mobile panel 12 is suspended on rollers 28 which engage rail 26 located along the top outside edge of vehicle 10. This allows the mobile panel 12 to move along the rail from the front of the trailer to the rear. At the bottom of mobile panel 12 is shown a angle member 48 which slides along the side of the bed 50 of the vehicle 10. There is approximately ½ inch clearance between the bed surface 50 and the top inside surface of angle members 48. Two box posts 52 connect the upper and lower sections of the mobile panel 12 and provide framing. On both ends of the mobile panel 12 are located quick release devices. The quick release device 60 shown in the open position, comprises hinges 44 and 46, channel 30, locking lever 38 and latch 36. Channel 30 is pivoted around upper hinge 44 and lower hinge 46. Upper peg 54, and lower peg 34 are located in channel 30. Curtain pole 32, attached to curtain 16, is inserted onto upper peg 54 and the lower portion of curtain pole 32 is slid over the top of lower peg 34 and then seated onto and around lower peg 34. This securely holds curtain pole 32 in channel 30. To close and lock the quick release device, locking lever 38 is raised 90° from the vertical position shown to a horizontal position and channel 30 is pivoted around upper and lower hinges 44 and 46 until support bar 56 rests against L bracket 40. Locking, lever 38 is then rotated 90° downward to the vertical position causing latch 36 to engage L bracket 40 thereby locking the quick release mechanism in the closed position. A second quick release device 58 is shown in the closed and locked position. The second quick release device 58 functions in the same manner as the quick release device 60 discussed above. The second quick release device 58 is used to secure the rear curtain 18 to the mobile panel 12. A plate 42 runs between the two box posts 52 and extends from the top of the mobile panel 12 to the bottom of the mobile panel 12. When both quick release devices are in the closed and locked position the load is thereby sealed. Buckle 66, which is attached to one of the vertical straps 20, secures the mobile panel 12 to the side of the vehicle when the vertical straps 20 are tensioned. Two such buckles secure the mobile panel 12, one on each side of the mobile panel 12.

The mobile panel 12 shown in FIG. 3 could also be used in an arrangement where there is a quick release device on one end of the mobile panel and a curtain pole receptacle located in place of a second quick release device. However, the advantage of having two quick release devices is that more tension can be applied to the curtains in that the curtain takeup caused by closing a single quick release device is doubled. This has advantages in longer trailer lengths. If two curtain pole receptacles are used on the mobile panel instead of the quick release devices, then the normal procedure to access a centrally located load would be to release the main tensioning device at the front of the trailer, release the vertical straps between the front of the trailer and the mobile panel, remove the curtain pole from the mobile panel and slide the curtain or the mobile panel and the curtain aside to access the load. This procedure would be reversed to close the curtain-sided vehicle. The addition of a quick release device or quick release devices to the mobile panel adds flexibility in that the front tensioning device and the vertical straps between the front and center of the vehicle do not have to be released to access a load near the center of the vehicle. The quick release device on the mobile panel is merely released, releasing horizontal tension on the curtain, and the appropriate straps near the center of the trailer are released to access a load in the center portion of the vehicle.

If a particular cargo load is longer than one half the length of the trailer, then the mobile panel can be moved to the front or the rear of the trailer and the removeable roof support removed so that a long load can be loaded or unloaded.

FIG. 4 is a top cross-section view of mobile panel 12. The quick release mechanism 60, on the left, is shown in the open position. This drawing shows box posts 52, plate 42 extending between the box posts 52, lower hinge 46, locking lever 38 and latch 36. Curtain pole 32 is shown seated on lower peg 34. Quick release mechanism 58 is shown in the closed position with latch 36 engaging L bracket 40.

FIG. 5 is a side view of mobile panel 12. Mobile panel 12 is shown suspended from rail 26 via wheels 28 and bracket 62. The lower edge of the pelmet 24 is shown overlapping the top of channel 30. Also shown are upper hinge 44 lower hinge 46 lower peg 34, and curtain pole 32. Locking lever 38 is shown in the locked position. Locking lever 38 slides over bracket 64 so that a padlock or other device can be used to secure the quick release mechanism 58. When the quick release device is opened, the channel 30 pushes the pelmet 24 outward and away from the vehicle 10. The top of channel 30 is low enough so that the pelmet is not stretched too far and damaged by the opening of the quick release device.

Modifications and variations in the structure illustrated and described will suggest themselves to those skilled in the art, once the principle of the present invention is understood. Accordingly, it is not intended that the scope of the invention should be limited by the drawings or this description, these being a lesser illustrative and typical.

What is claimed is:

1. A van body comprising a bed for supporting cargo, a roof supported above the bed at least two opposed vertical sides, at least one vertical open side for loading and unloading cargo, a guide rail along the roof at the open side, a plurality of traveling elements engaging the rail and movable there along comprising
   dual curtains suspended from the traveling elements and movable therewith,
   panel means suspended from the traveling elements and movable therewith, said panel means located between said dual curtains,
   connector means at each vertical edge of said dual curtains,
   first and second securing means at the vertical edges of said panel means for releasably holding said connector means,
   third and fourth securing means at the ends of the open side to receive and hold said connector means, and
   tensioning means at one end of the open side coacting with one of said third or fourth securing means to exert a horizontal tensioning force on the dual curtains and said panel means.

2. A van body as claimed in claim 1 wherein
said first securing means attached to said panel means is a quick release device comprising
channel means movable between open and closed positions,
retention means attached to said channel means to accept said connector means,
hinge means attached to said channel means for allowing movement of the channel means between opened and closed positions, said hinge means is attached to said panel means and is recessed into said panel means and said channel means is recessed into said panel means when in the closed position and is not recessed into said panel means in the open position, and
lever means attached to said channel means to move said channel between the open and closed positions.

3. A van body as in claim 2 including latch means attached to said channel means to secure said channel means to said panel means.

* * * * *